(12) United States Patent  
Hart et al.

(10) Patent No.: US 8,649,484 B2  
(45) Date of Patent: *Feb. 11, 2014

(54) APPARATUS, METHODS, AND ARTICLES OF MANUFACTURE TO PREDICT VECTORED DIGITAL SUBSCRIBER LINE (DSL) PERFORMANCE GAINS

(71) Applicant: AT&T Intellectual Property I, L.P., Atlanta, GA (US)

(72) Inventors: Richard Dennis Hart, Concord, CA (US); David Lewis Kimble, Danville, CA (US); Gary Tennyson, Pelham, AL (US); Jin Wang, Fremont, CA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/689,067

(22) Filed: Nov. 29, 2012

(65) Prior Publication Data

US 2013/0089129 A1     Apr. 11, 2013

Related U.S. Application Data

(63) Continuation of application No. 12/968,858, filed on Dec. 15, 2010, now Pat. No. 8,363,789.

(51) Int. Cl.
   *H04M 1/24*     (2006.01)
   *H04M 3/08*     (2006.01)
   *H04M 3/22*     (2006.01)

(52) U.S. Cl.
   USPC .................. 379/1.04; 379/22.08; 379/390.03; 379/417

(58) Field of Classification Search
   USPC .......... 379/1.01, 1.03, 1.04, 15.05, 22.08, 23, 379/24, 25, 27.01, 28, 29.01, 29.09, 32.01, 379/32.04, 390.03, 414, 417; 370/201; 375/254, 284, 285, 296
   See application file for complete search history.

(56) References Cited

U.S. PATENT DOCUMENTS

| | | | |
|---|---|---|---|
| 6,636,603 | B1 | 10/2003 | Milbrandt |
| 6,819,746 | B1 | 11/2004 | Schneider et al. |

(Continued)

FOREIGN PATENT DOCUMENTS

| | | |
|---|---|---|
| EP | 2106081 | 9/2009 |
| WO | 2006129145 | 12/2006 |

(Continued)

OTHER PUBLICATIONS

Cendrillon, Raphael et al., "Improved Linear Crosstalk Procompensation for DSL," IEEE International Conference on Acoustics, Speech and Signal Processing (ICASSP), May 2004. (4 pages).

(Continued)

*Primary Examiner* — Binh Tieu  
(74) *Attorney, Agent, or Firm* — Hanley, Flight and Zimmerman, LLC

(57) ABSTRACT

Apparatus, methods and articles of manufacture to predict vectored digital subscriber line (DSL) performance gains are disclosed. A disclosed example method includes determining a model coefficient of a noise-to-margin ratio (NMR) model from performance data measured for a DSL subscriber loop prior to provisioning of vectoring for the DSL subscriber loop, computing, using the model coefficient, a first NMR value with disturbers enabled and a second NMR value with disturbers disabled, and estimating an expected vectoring performance gain for the DSL subscriber loop based on the first and second NMR values.

17 Claims, 4 Drawing Sheets

(56) References Cited

U.S. PATENT DOCUMENTS

| | | | |
|---|---|---|---|
| 6,834,109 B1* | 12/2004 | Pare, Jr. et al. | 379/416 |
| 6,940,973 B1 | 9/2005 | Yeap et al. | |
| 6,970,560 B1 | 11/2005 | Hench et al. | |
| 7,050,552 B2 | 5/2006 | Comisky | |
| 7,813,420 B2 | 10/2010 | Cioffi et al. | |
| 2003/0099350 A1 | 5/2003 | Bostoen et al. | |
| 2005/0123027 A1* | 6/2005 | Cioffi et al. | 375/222 |
| 2006/0098725 A1* | 5/2006 | Rhee et al. | 375/222 |
| 2006/0198430 A1* | 9/2006 | Rhee et al. | 375/222 |
| 2006/0280238 A1 | 12/2006 | Cioffi et al. | |
| 2007/0019746 A1 | 1/2007 | Lin et al. | |
| 2007/0036339 A1 | 2/2007 | Cioffi et al. | |
| 2008/0071516 A1* | 3/2008 | Cioffi et al. | 703/21 |
| 2008/0205501 A1 | 8/2008 | Cioffi et al. | |
| 2008/0298444 A1 | 12/2008 | Cioffi et al. | |
| 2009/0059780 A1 | 3/2009 | De Lind Van Wijngaard et al. | |
| 2009/0073867 A1 | 3/2009 | Schenk | |
| 2009/0207985 A1 | 8/2009 | Cioffi et al. | |
| 2009/0296792 A1 | 12/2009 | Fang | |
| 2009/0323903 A1 | 12/2009 | Cioffi et al. | |
| 2010/0034374 A1 | 2/2010 | Ohman et al. | |
| 2010/0195478 A1 | 8/2010 | Schenk et al. | |
| 2010/0208785 A1* | 8/2010 | Lindqvist et al. | 375/227 |
| 2010/0329444 A1 | 12/2010 | Ashikhmin et al. | |
| 2011/0013725 A1 | 1/2011 | Chan | |
| 2012/0219123 A1 | 8/2012 | Berg et al. | |

FOREIGN PATENT DOCUMENTS

| | | |
|---|---|---|
| WO | 2006131791 | 12/2006 |
| WO | 2007008835 | 1/2007 |
| WO | 2007044326 | 4/2007 |
| WO | 2007146048 | 12/2007 |
| WO | 2008016585 | 2/2008 |
| WO | 2008046714 | 4/2008 |
| WO | 2009152188 | 12/2009 |
| WO | 2010002908 | 1/2010 |
| WO | 2010019486 | 2/2010 |

OTHER PUBLICATIONS

Cendrillon, Raphael et al., "Partial Crosstalk Cancellation Exploiting Line and Tone Selection in VDSL," Baiona Workshop on Signal Processing in Communications, Baiona, Spain, Sep. 2003. (6 pages).

Cendrillon, Raphael et al., "Partial Crosstalk Cancellation for Upstream VDSL," EURASIP Journal on Applied Signal Processing 2004:10, 1520-1535, Hindawi Publishing Corporation, Mar. 5, 2003. (16 pages).

Cendrillon, Raphael et al., "Partial Crosstalk Precompensation in Downstream VDSL," Elsevier Signal Processing, www.elsevier.com/locate/sigpro, Apr. 22, 2004. (15 pages).

Cendrillon, Raphael et al., "The Linear Zero-Forcing Crosstalk Canceler is Near-Optimal in DSL Channels," IEEE Global Telecommunications Conference, 2004 (GLOBECOM '04), Nov. 29-Dec. 3, 2004, vol. 4, pp. 2334-2338. (5 pages).

Cheong, Minho et al., "Computationally Efficient Cancellation of Partially-Overlapped Crosstalk in Digital Subscriber Lines," IEEE Communications Society, IEEE GLOBECOM 2005. (5 pages).

"Perfecting the Last Mile: Advanced DSL Management," Adaptive Spectrum and Signal Alignment, Inc., v1.2. (6 pages), 2005.

"ASSIA DSL Expresse Software," ASSIA DSL Solutions for Service Providers, accessed Oct. 13, 2010. (2 pages).

ASSIA, Inc. "ASSIA DSL Expresse," ASSIA DSL Solutions for Service Providers, 2010. (4 pages).

Lindqvist, Neiva, et al., "Impact of Crosstalk Estimation on the Dynamic Spectrum Management Performance," IEEE Global Telecommunications Conference, 2008, (IEEE GLOBECOM 2008), New Orleans, LO, Nov. 30-Dec. 4, 2008, pp. 1-5. (5 pages).

Ginis, George et al., "Vectored DSL to the Rescue," OSP Magazine, Mar. 2010. (4 pages).

Cioffi et al., "Vectored DSLs with DSM: The road to Ubiquitous Gigabit DSLs," World Telecommunications Conference, May 2006. (11 pages).

United States Patent and Trademark Office, "Notice of Allowance and Fee(s) Due", in connection with U.S. Appl. No. 12/968,858, mailed Sep. 21, 2012, (8 pages).

\* cited by examiner

US 8,649,484 B2

APPARATUS, METHODS, AND ARTICLES OF MANUFACTURE TO PREDICT VECTORED DIGITAL SUBSCRIBER LINE (DSL) PERFORMANCE GAINS

RELATED APPLICATION(S)

This patent arises from a continuation of U.S. application Ser. No. 12/968,858 entitled "APPARATUS, METHODS, AND ARTICLES OF MANUFACTURE TO PREDICT VECTORED DIGITAL SUBSCRIBER LINE (DSL) PERFORMANCE GAINS" and filed on Dec. 15, 2010, which is hereby incorporated by reference in its entirety.

FIELD OF THE DISCLOSURE

This disclosure relates generally to digital subscriber line (DSL) subscriber loops and, more particularly, to apparatus, methods and articles of manufacture to predict vectored DSL performance gains for subscriber loops.

BACKGROUND

Vectored DSL is an emerging DSL technology that offers significant improvements in achievable transmission rates over copper twisted-pair wires. In vectored DSL communication systems, a vectoring engine uses collected measurements characterizing crosstalk between a set of subscriber loops to reduce the effects of the crosstalk experienced by those subscriber loops.

DETAILED DESCRIPTION

Example apparatus, methods, and articles of manufacture to predict vectored DSL performance gains are disclosed. Installation of vectored digital subscriber line (DSL) communication systems may introduce operational, administrative and/or maintenance problems. For example, for cost efficiency it may be desirable to install vectoring technology when the vectoring technology can achieve a desired outcome such as a desired return-on-investment. In other words, there may be a tradeoff between expected circuit performance gains and the cost of deploying vectoring technology to achieve those expected performance gains. Thus, there may be a benefit to estimating the performance gains that vectoring can achieve prior to deployment of vectoring technology. Examples disclosed herein enable a network operator to quantify the performance gain(s) that are expected to result if vectoring were deployed on particular subscriber loops in their network(s).

A disclosed example method includes determining a model coefficient of a noise-to-margin ratio (NMR) model from performance data measured for a DSL subscriber loop prior to provisioning of vectoring for the DSL subscriber loop. The method computes, using the model coefficient, a first NMR value with disturbers enabled and a second NMR value with disturbers disabled. The method estimates an expected vectoring performance gain for the DSL subscriber loop based on the first and second NMR values.

A disclosed example apparatus includes a modeler and a performance gain estimator. The modeler determines a model coefficient using a least squares analysis of performance data measured for a DSL subscriber loop prior to provisioning of vectoring for the DSL subscriber loop. The performance gain estimator computes, using the model coefficient, a first NMR value with disturbers enabled and a second NMR value with disturbers disabled, and estimates an expected vectoring performance gain for the DSL subscriber loop based on the first and second NMR values.

Figure 1:
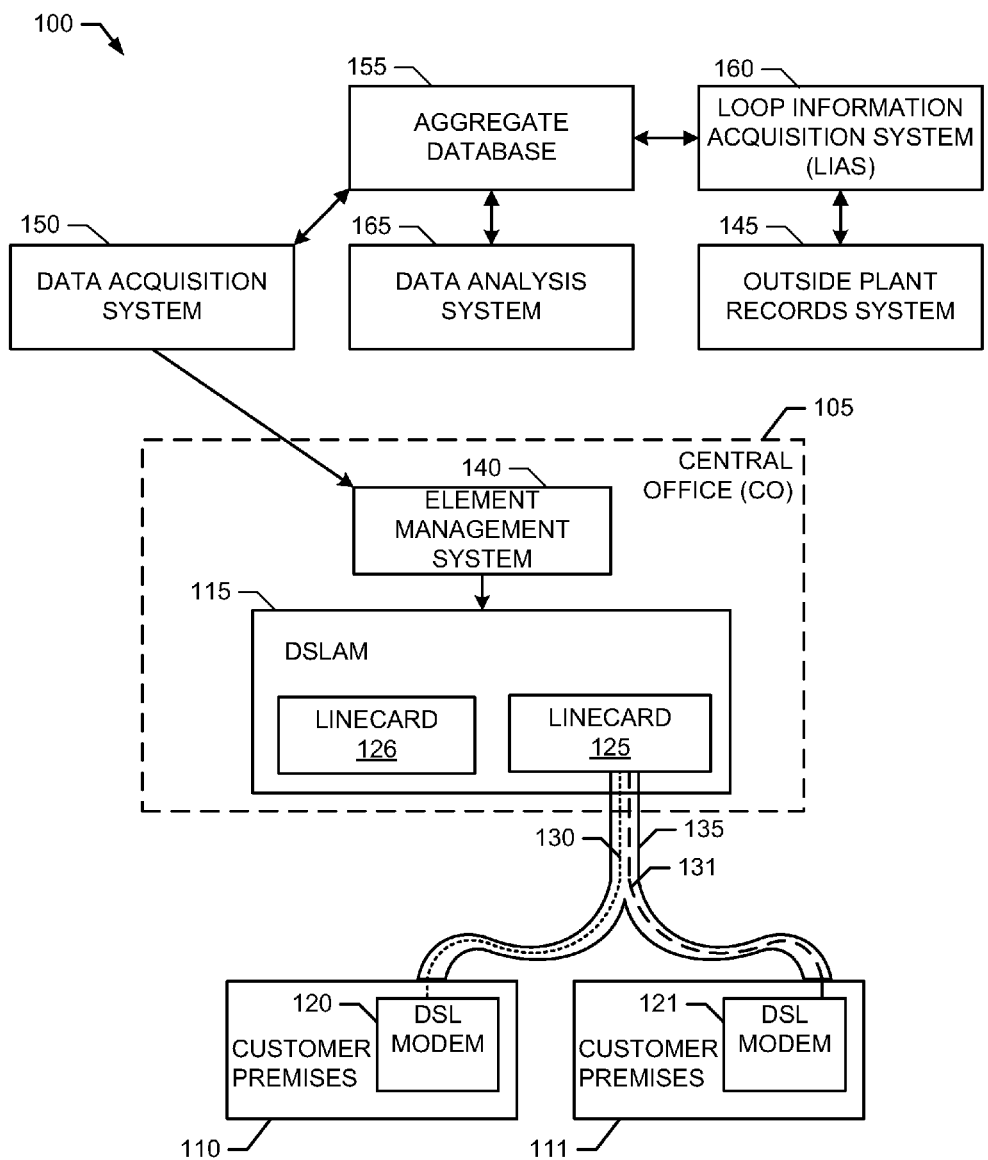
FIG. 1 is a schematic illustration of an example DSL communication system constructed in accordance with the teachings of this disclosure.

FIG. 1 illustrates an example DSL communication system 100. The example DSL communication system 100 of FIG. 1 includes any number and/or type(s) of central offices (COs) 105, remote terminals (RTs) and/or serving area interfaces (SAIs). The example CO 105 of FIG. 1, other COs, RTs and/or SAIs may be used to provide data and/or communication services to one or more customer premises, two of which are designated at reference numerals 110 and 111. Example data and/or communication services include, but are not limited to, telephone services, Internet services, data services, messaging services, instant messaging services, electronic mail (email) services, chat services, video services, audio services, and gaming services.

To provide communication services to the customer premises 110, 111, the example CO 105 of FIG. 1 includes any number and/or type(s) of DSL access multiplexer(s) (DSLAM(s)) 115 and/or vectored video-ready access device(s) (VRAD(s)), and the example customer premises 110, 111 of FIG. 1 each include customer-premises equipment (CPE) DSL modems 120 and 121. The example vectored DSLAM 115 of FIG. 1 includes and/or implements CO DSL modems (not shown) for respective ones of the customer premises 110, 111. CO DSL modems are sometimes referred to as "DSLAM ports," "VRAD ports," or simply "ports." In the illustrated example of FIG. 1, CO DSL modems are implemented on DSLAM linecards 125, 126, which each implement a plurality of CO DSL modems for respective ones of a plurality of CPE DSL modems (e.g., the example CPE DSL modems 120, 121). In the illustrated example, each of linecards 125, 126 implements sixty-four CO DSL modems.

The example DSLAM 115, the CO DSL modems within the DSLAM 115, and/or the example CPE DSL modems 120, 121 of FIG. 1 may be implemented, for example, in accordance with the International Telecommunications Union—Telecommunications Sector (ITU-T) G.993.x family of standards for VDSL, and/or the ITU-T G.992.x family of standards for asymmetric DSL (ADSL). However, the CO DSL modems and/or the CPE DSL modems 120, 121 may additionally or alternatively be implemented in accordance with any past, present and/or future standard, specification and/or recommendation relating to DSL or its associated technologies.

While in the illustrated example of FIG. 1, the DSLAM 115 is implemented at the CO 105, the DSLAM 115, another DSLAM and/or a VRAD may additionally or alternatively be implemented at an RT, at an SAI and/or at any other location between the CO 105 and the customer premises 110, 111. In such instances, a fiber-optic cable (not shown) may be used, for example, to communicatively couple the remotely located DSLAM/VRAD to the CO 105.

In the illustrated example of FIG. 1, the DSLAM 115 provides DSL services to the CPE DSL modems 120, 121 via respective subscriber loops 130 and 131. Subscriber loops are sometimes referred to as "wire-pairs," "telephone lines," "subscriber lines" and/or "loops." While throughout this disclosure reference is made to the example subscriber loops 130, 131 of FIG. 1, a subscriber loop (e.g., any of the example subscriber loops 130, 131) used to provide a DSL service to a customer premises (e.g., any of the customer premises 110, 111) may include and/or be constructed from one or more segments of copper twisted-pair wire (e.g., any combination of a feeder one (F1) cable, a feeder two (F2) cable, a feeder three (F3) cable, a feeder four (F4) cable, a distribution cable, a drop cable, and/or customer-premises wiring), terminals, and/or distributions points (e.g., an RT, an SAI, a serving terminal, a vault, a pedestal and/or any other type(s) of wiring distribution points). Such segments of copper twisted-pair wire may be spliced and/or connected end-to-end, and/or may be connected at only one end, thereby creating one or more bridged-taps. Regardless of the number, type(s), gauge(s) and/or topology of copper twisted-pair wires used to construct the example subscriber loops 130, 131, they will be referred to herein in the singular form. Nevertheless, it is to be understood that the term "subscriber loop" may refer to one or more copper twisted-pair wire segments and may or may not include one or more bridged taps.

When two subscriber loops (e.g., the example subscriber loops 130, 131) are part of the same cable bundle or cable binder 135, the signal transmissions on one subscriber loop (for example, on the subscriber loop 130) may cause or introduce crosstalk into other subscriber loops of the same binder 135 (for example, onto the subscriber loop 131). The amount of crosstalk varies with, for example, signal transmission level, frequency and/or length of the binder 135. Crosstalk may interfere with and/or reduce the achievable transmission speed on a particular subscriber loop 130, 131. As used herein, the term "disturber" refers to a DSL service on a particular subscriber loop that introduces crosstalk into another subscriber loop. As used herein, a disturber is enabled when the DSL service on its associated subscriber loop is active or in-service and, thus, is currently introducing crosstalk into another subscriber loop. As used herein, a disturber is disabled when the DSL service on its associated subscriber loop is inactive or out-of-service and, thus, is not currently introducing crosstalk into another subscriber loop. In the illustrated example, the binder 135 includes twenty-five copper twisted-pair wires.

In some examples, a 25-pair cable binder is divided into groupings of 5 wire pairs (e.g., pairs 1-5, 6-10, etc.). In some examples, the 25-pair binder groups are combined into groups of 4. A group of 4 25-pair binders may be referred to as a hundred-pair count or a complement, with a first binder (binder1) containing pairs 1-25, a second binder (binder 2) containing pairs 26-50, etc. In some examples, a distribution area cable includes multiple complements (e.g., complement 1 contains binders 1-4, complement 2 contains binders 5-8, etc.). During manufacture, color-coded plastic bands may be placed around binders and binder complements to identify the corresponding binder and complement. This color coding facilitates use and re-use of wire pair colors in the field. In some examples, wire pairs in binders and complements are woven around each other but not woven together during manufacture. The colored plastic band wraps help ensure that a binder group remains intact as far as possible into the distribution area, with the pairs keeping their physical co-extensiveness as long as is physically possible.

To collect performance data, the example DSL communication system 100 of FIG. 1 includes an element management system 140. The example element management system 140 of FIG. 1 periodically (e.g., weekly, daily, hourly, etc.) or aperiodically collects performance data (e.g., a maximum attainable data rate, an error count, an estimated loop length, a DSL connection rate, a loop attenuation value, an error rate, a signal-to-noise ratio, a bit allocation, a noise margin, a DSL modem configuration, etc.) from the example DSLAM 115 and/or the example customer-premises DSL modems 120, 121.

To maintain topological data, the example DSL communication system 100 of FIG. 1 includes an outside plant records system 145. The example outside plant records system 145 of FIG. 1 maintains, stores and/or makes accessible an inventory of the equipment and/or the interconnections of the equipment of the example DSL communication system 100 including, but not limited to, assignments of the subscriber loops 130, 131 to DSLAM ports. In some examples, the example outside plant records system 145 maintains, stores and/or records for each subscriber loop 130, 131 a 4-tuple representing a wire center, a distribution area, a cable 135, and a wire pair.

To proactively monitor the performance of the DSL communication system 100, the example DSL communication system 100 of FIG. 1 includes a data acquisition system 150. Based on a schedule (e.g., hourly, daily, weekly, etc.) and/or when initiated by, for example, a technician and/or maintenance personnel, the example data acquisition system 150 of FIG. 1 collects attributes such as performance data and configuration parameters via the element management system 140 and stores the collected performance data in an aggregate database 155. During collection, the example data acquisition system 150 associates the collected attributes for a particular subscriber loop 130, 131 with a customer billing access number (BAN) assigned to that subscriber loop 130, 131. Example attributes that may be collected include, but are not limited to, a quiet line noise (QLN), a current bit rate, a plurality of attenuations for respective ones of a plurality of frequencies (i.e., an attenuation vector), and a status of the line. An example status attribute is a flag having a first value when the associated subscriber loop is out-of-service and a second value when the loop is in service or active.

To store performance data and topological information, the example DSL communication system 100 of FIG. 1 includes the example aggregate database 155. The example aggregate database 155 of FIG. 1 stores performance data and outside plant topology information for a plurality of subscriber loops (e.g., the example subscriber loops 130, 131). The performance data and/or outside topology information is stored together with a BAN that identifies (in some examples, uniquely) the associated subscriber loop 130, 131, and a timestamp representing when, for example, the performance data was measured. Any number and/or type(s) of data structures may be used to implement the example aggregate database 155 of FIG. 1. The example aggregate database 155 may be implemented by any number and/or type(s) of volatile and/or non-volatile memory(ies), memory device(s), and/or storage device(s).

To extract topological information, the example DSL communication system 100 of FIG. 1 includes a loop information acquisition system 160. A periodically or periodically (e.g., daily), the example loop information acquisition system 160 of FIG. 1 extracts topology information from the example outside plant records system 145 and stores the extracted topology information in the example aggregate database 155. While collecting topology information, the example loop information acquisition system 160 associates the topological information for a particular subscriber loop with the BAN assigned to that subscriber loop and a timestamp representing, for example, when the topological information was extracted from the outside plant records system 145. Using any number and/or type(s) of method(s), message(s), protocol(s) and/or script(s), the example loop information acquisition system 160 of FIG. 1 extracts topology information from the example outside plant records system 145 and produces one or more output reports that are parsed and used to obtain the topology information that is stored in the example aggregate database 155.

To estimate vectored DSL performance gains, the example DSL communication system 100 of FIG. 1 includes a data analysis system 165. As explained in more detail below in connection with FIGS. 2-4, the example data analysis system 165 of FIG. 1 obtains performance data and topology information from the example aggregate database 155, and uses the obtained data and information to construct an NMR estimator model. The example data analysis system 165 uses the NMR estimator model to estimate a first NMR value with crosstalk disturbers disabled and a second NMR value with the crosstalk disturbers enabled. The data analysis system 165 estimates a vectored DSL performance gain by computing a difference between the estimated first and second NMR values. An example manner of implementing the example data analysis system 165 of FIG. 1 is described below in connection with FIG. 2.

While an example DSL communication system 100 is illustrated in FIG. 1, one or more of the elements, processes and/or devices illustrated in FIG. 1 may be combined, divided, re-arranged, omitted, eliminated and/or implemented in any other way. Further, the example element management system 140, the example outside plant records system 145, the example data acquisition system 150, the example aggregate database 155, the example loop information acquisition system 160 and/or the example data analysis system 165 may be implemented by hardware, software, firmware and/or any combination of hardware, software and/or firmware. Thus, for example, any of the example element management system 140, the example outside plant records system 145, the example data acquisition system 150, the example aggregate database 155, the example loop information acquisition system 160 and/or the example data analysis system 165 could be implemented by the example processor platform P100 of FIG. 6 and/or one or more circuit(s), programmable processor(s), application specific integrated circuit(s) (ASIC(s)), programmable logic device(s) (PLD(s)) and/or field programmable logic device(s) (FPLD(s)), field-programmable gate array(s) (FPGA(s)), fuses, etc. When any apparatus claim of this patent incorporating one or more of these elements is read to cover a purely software and/or firmware implementation, at least one of the example element management system 140, the example outside plant records system 145, the example data acquisition system 150, the example aggregate database 155, the example loop information acquisition system 160 and/or the example data analysis system 165 are hereby expressly defined to include a tangible article of manufacture such as a tangible computer-readable medium storing the firmware and/or software. Further still, the example DSL communication system 100 may include one or more elements, processes and/or devices in addition to, or instead of, those illustrated in FIG. 1, and/or may include more than one of any or all of the illustrated elements, processes and devices.

As used herein, the term tangible computer-readable medium is expressly defined to include any type of computer-readable medium and to expressly exclude propagating signals. Example computer-readable medium include, but are not limited to, a volatile and/or non-volatile memory, a volatile and/or non-volatile memory device, a compact disc (CD), a digital versatile disc (DVD), a floppy disk, a read-only memory (ROM), a random-access memory (RAM), a programmable ROM (PROM), an electronically-programmable ROM (EPROM), an electronically-erasable PROM (EEPROM), an optical storage disk, an optical storage device, magnetic storage disk, a magnetic storage device, a cache, and/or any other storage media in which information is stored for any duration (e.g., for extended time periods, permanently, brief instances, for temporarily buffering, and/or for caching of the information) and which can be accessed by a processor, a computer and/or other machine having a processor, such as the example processor platform P100 discussed below in connection with FIG. 6. As used herein, the term non-transitory computer-readable medium is expressly defined to include any type of computer-readable medium and to exclude propagating signals.

Figure 2:
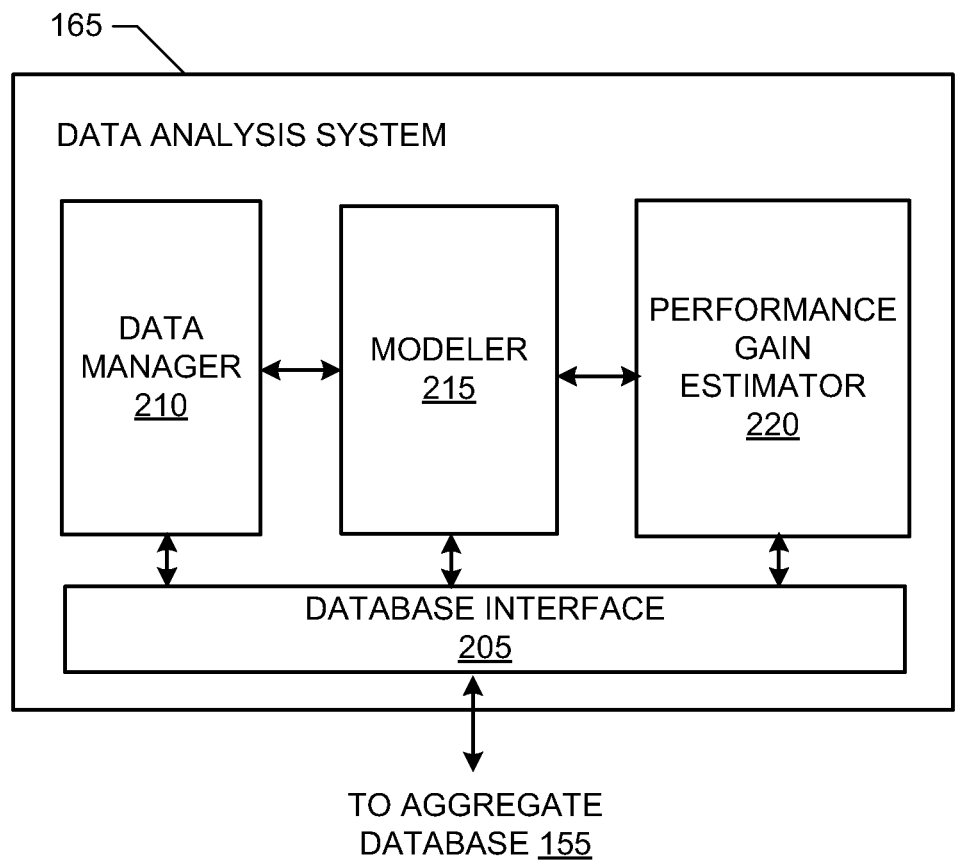
FIG. 2 illustrates an example manner of implementing the example data analysis system of FIG. 1.

FIG. 2 illustrates an example manner of implementing the example data analysis system 165 of FIG. 1. To communicate with the example aggregate database 155, the example data analysis system 165 of FIG. 2 includes any number and/or type(s) of database interface(s) 205. Using any number and/or type(s) of message(s), protocol(s), interface(s), method(s), logic and/or application programming interface(s), the example database interface 205 of FIG. 2 enables a data manager 210 to obtain performance and loop topology information from the example aggregate database 155.

To generate data suitable for defining an NMR model, the example data analysis system 165 of FIG. 2 includes the example data manager 210. For example and with reference to a subscriber loop (e.g., one of the example subscriber loops 130, 131 of FIG. 1), the data manager 210 of FIG. 2 obtains an attenuation vector, and estimates an equivalent working length (EWL) for the subscriber loop 130, 131 from the attenuation vector. In some examples, the EWL is expressed in units of 26 gauge copper wire. The example data manager 210 may estimate the EWL by, for example, curve fitting the attenuation values of the obtained attenuation vector to an attenuation versus frequency equation for 26 gauge copper wire. When bridge taps are detected, the example data manager 210 may correct for the presence of the bridge taps when performing the curve fitting.

The example data manager 210 of FIG. 2 also obtains from the aggregate database 155, via the database interface 205, one or more NMR values previously measured for the subscriber loop under analysis (e.g., one of the subscriber loops 130, 131). For each collected NMR value, the data manager 210 uses the timestamp associated with a currently considered NMR value to obtain associated topology information. The data manager 210 uses the timestamp to identify topology information applicable to the time period during which the currently considered NMR value was measured. The data manager 210 uses the identified topology information to identify other subscriber loops belonging to the same cable binder, complement and/or distribution area as the presently considered subscriber loop (e.g., one of the subscriber loops 130, 131). For each of the identified subscriber loops, the data manager 210 uses the timestamp to determine whether the subscriber loop was out-of-service or in-service during the time period associated with the currently considered NMR. In other words, for each NMR value, the example data manager 210 determines the number of active subscriber loops that may have contributed crosstalk (i.e., a disturber count) during the time period that the NMR value was measured. In some examples, a subscriber loop is only included in the disturber count when a DSL service is in service on the subscriber loop.

For a presently considered subscriber loop "i", the example data manager 210 of FIG. 2 computes four disturber terms M(i,25pair), M(i,other75), M(i,other_cable) and M(i,other_DA), where M(i,25pair) represents the number of active DSL circuits in the same binder as "i", M(i,other75) represents the number of active DSL circuits in the same complement but not in the same binder, M(i, other_cable) represents the number of active DSL pairs in the same cable but not in the same complement, and M(i,other_DA) represents the number of active DSL circuits in the distribution area but not inside the cable as "i". The phrase "other 75" means the other 75 pairs in the 100 pair complement. The phase "other cable" means others in the cable but not in the same complement as pair i. The example disturber terms M(i,25pair), M(i,other75), M(i,other_cable) and M(i,other_DA) are mutually exclusive counts and are not arithmetically dependent counts to reduce the stochastic dependence between interferer counts of binder group cable.

In some examples, the example data manager 210 of FIG. 2 stores the computed EWL estimate and disturber counts in the example aggregate database 155 for subsequent retrieval during, for example, capacity and/or engineering planning relating to the deployment of vectored DSL technologies.

To determine an NMR model, the example data analysis system 165 of FIG. 2 includes a modeler 215. The example modeler 215 of FIG. 2 uses the obtained NMR values, the estimated EWL, and the computed disturber counts to estimate the coefficients of the NMR model. In some examples, the modeler 215 uses a least squares regression to determine the coefficients of the model. An example NMR model can be expressed mathematically as:

$$NMR_i = \alpha + \beta_1 * \log(M_{i,25\ pait} + 1) +$$
$$\beta_2 * \log(M_{i,other\ 75} + 1) + \beta_3 * \log(M_{i,other\_cable} + 1) +$$
$$\beta_4 * \log(M_{i,other\_DA} + 1) + \beta_5 * EWL + \varepsilon_i$$

EQN (1)

Where log( ) represents a logarithm base 10, i represents the presently considered loop, $\alpha$ is a y-intercept, $\beta_i$ are the model coefficients to be selected or determined, and $\varepsilon_i$ is an error term. The example modeler 215 selects the model coefficients $\beta_i$ to reduce (e.g., minimize) the error term $\varepsilon_i$. In some examples, the modeler 215 of FIG. 2 stores the model coefficients in the example aggregate database 155 for subsequent retrieval during, for example, capacity and/or engineering planning relating to the deployment of vectored DSL technologies.

To estimate vectored DSL performance gains, the example data analysis system 165 of FIG. 2 includes a performance gain estimator 220. The example performance gain estimator 220 of FIG. 2 uses EQN (1) to compute a first NMR value assuming disturbers are enabled and a second NMR value assuming the disturbers are disabled. The example performance gain estimator 220 computes a difference between the first and second NMR values. That difference represents an estimate of the performance gain achievable if vectoring were provisioned for the subscriber loop i. In some examples, the example performance gain estimator 220 of FIG. 2 stores the estimated vectored DSL performance gain in the example aggregate database 155 for subsequent retrieval during, for example, capacity and/or engineering planning relating to the deployment of vectored DSL technologies.

While a manner of implementing the example data analysis system 165 of FIG. 1 is illustrated in FIG. 2, one or more of the elements, processes and/or devices illustrated in FIG. 2 may be combined, divided, re-arranged, omitted, eliminated and/or implemented in any other way. Further, the example database interface 205, the example data manager 210, the example modeler 215, the example performance gain estimator 220 and/or, more generally, the example data analysis system 165 may be implemented by hardware, software, firmware and/or any combination of hardware, software and/or firmware. Thus, for example, any of the example database interface 205, the example data manager 210, the example modeler 215, the example performance gain estimator 220 and/or, more generally, the example data analysis system 165 could be implemented by the example processor platform P100 of FIG. 4 and/or one or more circuit(s), programmable processor(s), application specific integrated circuit(s) ASIC(s), PLD(s) and/or FPLD(s), FPGA(s), fuses, etc. When any apparatus claim of this patent incorporating one or more of these elements is read to cover a purely software and/or firmware implementation, at least one of the example database interface 205, the example data manager 210, the example modeler 215, the example performance gain estimator 220 and/or, more generally, the example data analysis system 165 are hereby expressly defined to include a tangible article of manufacture such as a tangible computer-readable medium storing the firmware and/or software. Further still, the example data analysis system 165 may include one or more elements, processes and/or devices in addition to, or instead of, those illustrated in FIG. 2, and/or may include more than one of any or all of the illustrated elements, processes and devices.

Figure 3:
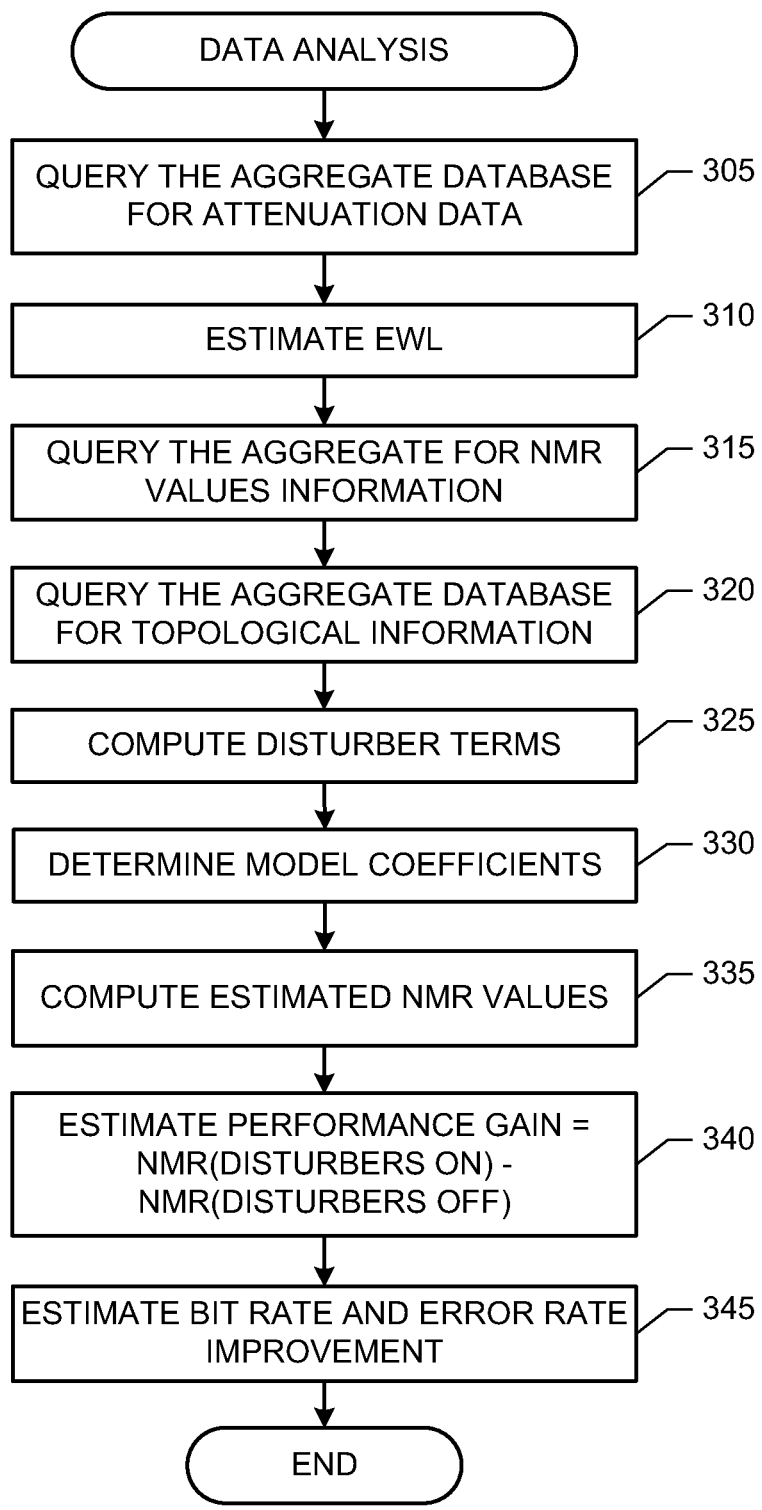
FIG. 3 is a flowchart representative of example machine-accessible instructions that may be executed by, for example, one or more processors to implement the example data analysis systems of FIGS. 1 and 2.

FIG. 3 is a flowchart representing machine-accessible instructions that may be executed by, for example, one or more processors to predict vectored DSL performance gains. A processor, a controller and/or any other suitable processing device may be used, configured and/or programmed to perform the example process of FIG. 3. For example, the process of FIG. 3 may be embodied in coded instructions stored on a tangible computer-readable medium. Machine-readable instructions comprise, for example, instructions that cause a processor, a computer and/or a machine having a processor to perform one or more processes. Alternatively, some or all of the example process of FIG. 3 may be implemented using any combination(s) of ASIC(s), PLD(s), FPLD(s), FPGA(s), fuses, discrete logic, hardware, firmware, etc. Also, some or all of the example process of FIG. 3 may be implemented manually or as any combination of any of the foregoing techniques, for example, any combination of firmware, software, discrete logic and/or hardware. Further, many other methods of implementing the example operations of FIG. 3 may be employed. For example, the order of execution of the blocks may be changed, and/or one or more of the blocks described may be changed, eliminated, sub-divided, or combined. Additionally, the blocks of any or all of the example process of FIG. 3 may be carried out sequentially and/or carried out in parallel by, for example, separate processing threads, processors, devices, discrete logic, circuits, etc.

The example process of FIG. 3 begins with the example data manager 210 obtaining performance data for a presently considered subscriber loop from the aggregate database 155 via the example database interface 205 (block 305). Using measured attenuation data, the data manager 210 computes or estimates the EWL of the presently considered loop (block 310).

The data manager 210 obtains from the aggregate database 155 via the database interface 205 one or more NMR values previously measured for the presently considered subscriber loop (e.g., one of the example subscriber loops 130, 131) (block 315). For each collected NMR value, the data manager 210 uses the timestamp associated with a currently considered NMR value to obtain associated topology information (block 320). As described above in connection with FIG. 2, the data manager 210 uses the obtained topology information to compute the disturber terms M(i,25pair), M(i,other75), M(i,other_cable) and M(i,other_DA) (block 325).

Using the obtained NMR values, the estimated EWL, and the computed disturber counts, the example modeler 210 uses a least-squares regression and/or analysis to determine and/or select the coefficients of the example NMR model of EQN (1) (block 330). The example performance gain estimator 220 of FIG. 2 uses EQN (1) to compute a first NMR value assuming disturbers are enabled and a second NMR value assuming the disturbers are disabled (block 335). The performance gain estimator 220 computes a difference between the first and second NMR values that represents an estimate of the performance gain achievable if vectoring were provisioned for the subscriber loop (block 340).

In some examples, the example performance gain estimator 220 uses Shannon's Law to estimate a bit rate and/or an error rate improvement that may result if the predicted vectored DSL performance gain was achieved in practice (block 345). Control then exits from the example process of FIG. 3.

Figure 4:
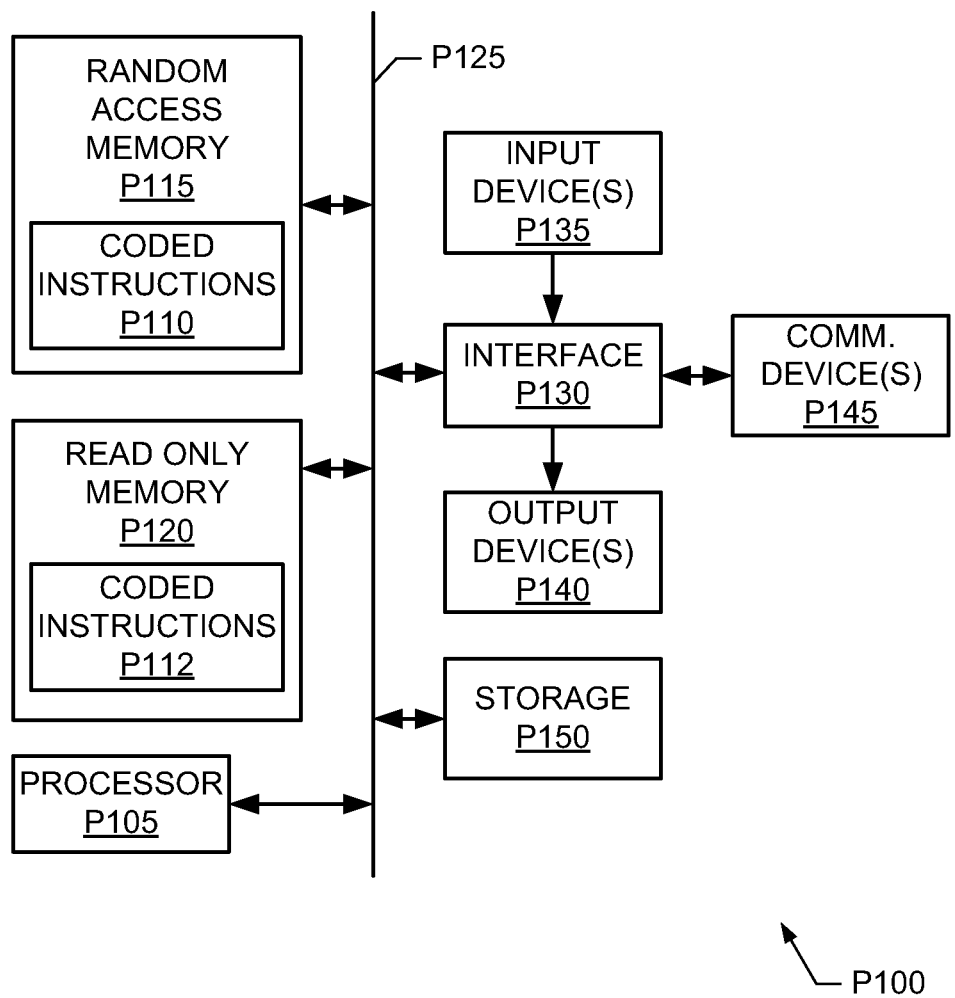
FIG. 4 is a schematic illustration of an example processor platform that may be used and/or programmed to execute the example machine accessible instructions of FIG. 3 to implement the example systems of FIGS. 1 and/or 2.

FIG. 4 is a block diagram of an example processor platform P100 capable of executing the example process of FIG. 3 to estimate the vectored DSL performance gains. The example processor platform P100 can be, for example, a computer, a workstation, a server and/or any other type of computing device containing a processor.

The processor platform P100 of the instant example includes at least one programmable processor P105. For example, the processor P105 can be implemented by one or more Intel® microprocessors from the Pentium® family, the Itanium® family or the XScale® family. Of course, other processors from other processor families and/or manufacturers are also appropriate. The processor P105 executes coded instructions P110 and/or P112 present in main memory of the processor P105 (e.g., within a volatile memory P115 and/or a non-volatile memory P120) and/or in a storage device P150. The processor P105 may execute, among other things, the example machine-accessible instructions of FIG. 4 to estimate the performance gain due to vectoring. Thus, the coded instructions P110, P112 may include the example instructions of FIG. 3.

The processor P105 is in communication with the main memory including the non-volatile memory P120 and the volatile memory P115, and the storage device P150 via a bus P125. The volatile memory P115 may be implemented by Synchronous Dynamic Random Access Memory (SDRAM), Dynamic Random Access Memory (DRAM), RAMBUS Dynamic Random Access Memory (RDRAM) and/or any other type of RAM device. The non-volatile memory P120 may be implemented by flash memory and/or any other desired type of memory device. Access to the memory P115 and the memory P120 may be controlled by a memory controller.

The processor platform P100 also includes an interface circuit P130. Any type of interface standard, such as an external memory interface, serial port, general-purpose input/output, an Ethernet interface, a universal serial bus (USB), and/or a PCI express interface, etc, may implement the interface circuit P130.

The interface circuit P130 may also include one or more communication device(s) P145 such as a network interface card to facilitate exchange of data, packets, and/or routing information with other nodes, servers, devices and/or routers of a network.

In some examples, the processor platform P100 also includes one or more mass storage devices P150 to store software and/or data. Examples of such storage devices P150 include a floppy disk drive, a hard disk drive, a solid-state hard disk drive, a CD drive, a DVD drive and/or any other solid-state, magnetic and/or optical storage device. The example storage devices P150 may be used to, for example, store the example coded instructions of FIG. 3 and/or the aggregate database 155 of FIG. 1.

Although certain example methods, apparatus and articles of manufacture have been described herein, the scope of coverage of this patent is not limited thereto. On the contrary, this patent covers all systems, methods, apparatus and articles of manufacture falling within the scope of the claims of this patent.

What is claimed is:

1. A method to predict vectored digital subscriber line subscriber loop performance gains, the method comprising:
computing, with a processor using a model coefficient of a noise-to-margin ratio model, a first noise-to-margin ratio value of the digital subscriber line subscriber loop with disturbers enabled and a second noise-to-margin ratio value of the digital subscriber line subscriber loop with disturbers disabled, the model coefficient being based on performance data measured before vectoring the digital subscriber line subscriber loop; and
estimating, with the processor, an expected vectoring performance gain for the digital subscriber line subscriber loop based on the first and second noise-to-margin ratio values;
estimating an error rate improvement based on the expected vectoring performance gain; and
determining a number of digital subscriber line services active in a distribution area.

2. The method as defined in claim 1, wherein Shannon's law is used to estimate the bit rate improvement.

3. The method as defined in claim 1, wherein the model coefficient is determined using a least squares analysis of the performance data.

4. The method as defined in claim 3, wherein the least squares analysis is based on a number of disturbers.

5. The method as defined in claim 1, further comprising:
estimating an equivalent working length for the digital subscriber line subscriber loop based on attenuation data;
determining a number of active digital subscriber line services in a cable binder; and
determining the model coefficient using the estimated equivalent working length and the number of active digital subscriber line services.

6. The method as defined in claim 5, wherein the equivalent working length is estimated using a curve fitting.

7. An apparatus to predict vectored digital subscriber line subscriber loop performance gains, the apparatus comprising:
a memory having machine readable instructions stored thereon; and
a processor to execute the instructions to perform operations comprising:
computing, using a model coefficient of a noise-to-margin ratio model, a first noise-to-margin ratio value of the digital subscriber line subscriber loop with disturbers enabled and a second noise-to-margin ratio value of the digital subscriber line subscriber loop with disturbers disabled, the model coefficient being based on performance data measured before vectoring the digital subscriber line subscriber loop;

estimating an expected vectoring performance gain for the digital subscriber line subscriber loop based on the first and second noise-to-margin ratio values;

estimating an error rate improvement based on the expected vectoring performance gain; and determining a number of digital subscriber line services active in a distribution area.

8. The apparatus as defined in claim 7, wherein the error rate improvement is estimated using Shannon's law.

9. The apparatus as defined in claim 7, wherein the operations further comprise determining the model coefficient using a least squares analysis of the performance data.

10. The apparatus as defined in claim 9, wherein determining the model coefficient comprises determining a variable used in the least squares analysis, the variable being representative of an equivalent working length.

11. The apparatus as defined in claim 7, wherein the operations further comprise:

estimating an equivalent working length for the digital subscriber line subscriber loop based on attenuation data;

calculating a number of active digital subscriber line services in a cable binder complement; and determining the model coefficient based on the estimated equivalent working length and the number of active digital subscriber line services.

12. A tangible machine readable storage medium comprising machine readable instructions which, when executed, cause a machine to perform operations comprising:

determining, using a model coefficient of a noise-to-margin ratio model, a first noise-to-margin ratio value of a digital subscriber line subscriber loop with disturbers enabled and a second noise-to-margin ratio value of a digital subscriber line subscriber loop with disturbers disabled, the model coefficient being based on performance data measured prior to vectoring the digital subscriber line subscriber loop;

estimating an expected vectoring performance gain for the digital subscriber line subscriber loop based on the first and second noise-to-margin ratio values;

estimating an error rate improvement based on the expected vectoring performance gain; and determining a number of digital subscriber line services active in a distribution area.

13. The tangible machine readable storage medium as defined in claim 12, wherein the error rate improvement is estimated using Shannon's law.

14. The tangible machine readable storage medium as defined in claim 12, wherein the operations further comprise determining the model coefficient based on a least squares analysis of the performance data.

15. The tangible machine readable storage medium as defined in claim 14, wherein determining the model coefficient comprises calculating an independent variable of the least squares analysis, the independent variable being a third noise-to-margin ratio value.

16. The tangible machine readable storage medium as defined in claim 12, wherein the operations further comprise:

estimating an equivalent working length for the digital subscriber line subscriber loop based on attenuation data;

calculating a number of disturbers representing a number of active digital subscriber line services in a cable binder; and determining the model coefficient based on the estimated equivalent working length and the number of disturbers.

17. The tangible machine readable storage medium as defined in claim 16, wherein the estimated equivalent working length is based on a curve fitting.

* * * * *